(12) United States Patent
Hodjat

(10) Patent No.: US 7,025,928 B2
(45) Date of Patent: Apr. 11, 2006

(54) METHOD OF FLOW FORMING A METAL PART

(75) Inventor: Yahya Hodjat, Oxford, MI (US)

(73) Assignee: The Gates Corporation, Denver, CO (US)

( * ) Notice: Subject to any disclaimer, the term of this patent is extended or adjusted under 35 U.S.C. 154(b) by 233 days.

(21) Appl. No.: 10/627,073

(22) Filed: Jul. 24, 2003

(65) Prior Publication Data

US 2005/0019201 A1 Jan. 27, 2005

(51) Int. Cl.
*B22F 3/24* (2006.01)

(52) U.S. Cl. ...................................................... 419/28
(58) Field of Classification Search .................. 419/28
See application file for complete search history.

(56) References Cited

U.S. PATENT DOCUMENTS

| | | | |
|---|---|---|---|
| 3,874,049 A | 4/1975 | Ferguson | 29/149.5 |
| 4,059,879 A * | 11/1977 | Chmura et al. | 384/513 |
| 4,244,738 A | 1/1981 | Storchheim | 75/211 |
| 4,393,563 A | 7/1983 | Smith | 29/149.5 |
| 4,464,148 A | 8/1984 | Tanaka et al. | 474/167 |
| 4,594,217 A | 6/1986 | Samal | 419/3 |
| 4,708,912 A * | 11/1987 | Huppmann | 428/547 |
| 5,055,090 A | 10/1991 | Miranti, Jr. | 474/249 |
| 5,344,508 A | 9/1994 | Gilman et al. | 148/514 |
| 5,729,822 A | 3/1998 | Shivanath et al. | 428/551 |
| 5,754,937 A | 5/1998 | Jones et al. | 419/38 |
| 5,947,853 A | 9/1999 | Hodjat et al. | 474/166 |
| 5,972,132 A | 10/1999 | Cadle | 148/514 |
| 6,110,419 A * | 8/2000 | Buckley-Golder et al. | 419/28 |
| 6,440,357 B1 | 8/2002 | Hinzmann | 419/66 |
| 6,517,772 B1 * | 2/2003 | Woolf | 419/28 |
| 6,521,173 B1 | 2/2003 | Kumar et al. | 419/23 |
| 6,670,048 B1 * | 12/2003 | Fujiwara | 428/548 |

* cited by examiner

*Primary Examiner*—Daniel Jenkins
(74) *Attorney, Agent, or Firm*—J. A. Thurnau, Esq.; C. H. Castleman, Esq.; P. N. Dunlap

(57) ABSTRACT

A method of flow forming sintered metal parts. The first step is forming a round disk by conventional powder metal process. The disk can be a donut shape part with or without a flange on one side of its outer diameter. The disk can then be copper impregnated or used as is, depending on the requirements. The disk is placed in a spinner held in proper tooling and grooves are spun in its outer diameter. The spinning can be done with a finishing roller or by a pre-finishing roller, followed by a finishing roller. This process not only creates a part with great accuracy, it also densifies and eliminates the powder metal porosities on the surface layer by the pressures inserted in spinning.

6 Claims, 2 Drawing Sheets

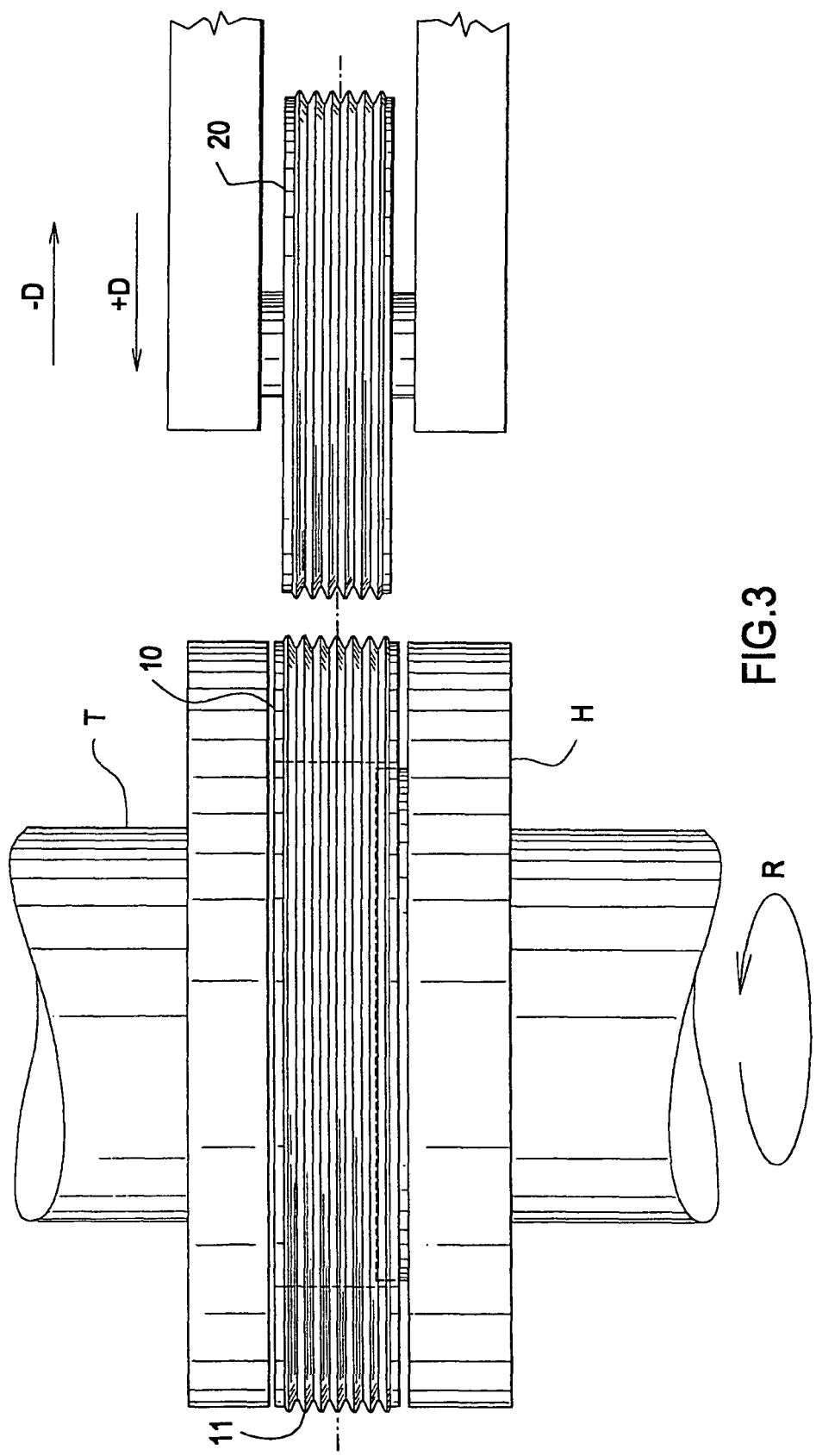

METHOD OF FLOW FORMING A METAL PART

FIELD OF THE INVENTION

The invention relates to a method of flow forming a metal part, namely, a sintered or cast metal part.

BACKGROUND OF THE INVENTION

Powder metal manufacturing is a known process. Fine particles of metal powder are compacted to the desired shape and subsequently sintered in a furnace. Sintering causes melting and welding of powder particles on their respective surfaces to form a part.

There are two inherent disadvantages to powder metal process. The first problem is that it is very difficult, if not impossible, to compact the powder metal to 100% density of the material to eliminate all voids and porosities. Voids reduce the strength of the part and can also create internal corrosion. The solution to this problem is impregnation, or infiltration, of the voids by copper, resin, or other material. Resin impregnation has limited applications because it does not increase material properties and the resin melts down at low temperatures, for example, in a painting oven. Copper impregnation, while adding to the material strength, is costly and more importantly creates dimensional changes to the part reducing the dimensional accuracy.

The second problem with powder metal process is that the capability of compacting the powder in the horizontal direction, perpendicular to the compaction force, is very limited. Most powder metal operations use gravity to fill the powder in the mold or die. The compaction direction is vertical. This means that current products like multiple ribbed pulley grooves cannot be made by a powder metal/sinter process, while sprocket teeth can be manufactured using a powder metal/sinter process.

Densification of powder metal (PM) is a technology that has been around as long as the PM technology itself. There are many known methods to accomplish densification. The most common process is cold forging. Hot forging and rolling are also known for densification.

Spinning is also well known as a metal forming process. Spinning is generally defined as when a work piece is turned and the tool, which is also usually able to turn i.e. installed on bearings, forms the workpiece. The most common spinning process changes the shape of a sheet metal blank while keeping it in sheet form. Examples of this are forming pots and pans, spinning grooved pulleys, as well as spinning the front curved shape of jet engines (a hard to form titanium alloy).

In general spinning has the ability to flow metal much more readily than other processes. As the part turns, the roller brings the metal to its plastic state, flows it, and departs it. Every element of the material is brought to plastic flow over and over again as the part turns. Consequently, spinning can flow the metal thousands of percent, virtually without limit.

Flow forming by spinning is done in the same manner as for spinning, but usually under greater loads and pressures. The material is first brought into a plastic state, at which point it is flowed like pottery clay. Examples of this type of spinning are making multiple-grooved pulleys from flat blanks, spinning hubs from flat blanks, and spinning gears from flat blanks.

On the other hand, press forming can do the same, but only through use of multiple stations, perhaps thousands of stations or more. Spinning can flow metal on a single piece of equipment as opposed to a press which for a given part might require thousands of stations, each incrementally forming the part per cycle.

Automotive pulleys are conventionally made by spinning sheet metal using a number of different processes known in the art. However, for crankshaft damper pulleys, in many cases the mass of the pulley has to be higher than what spun sheet metal pulleys can provide. A higher mass is required to provide the proper amount of inertia necessary to damp crankshaft vibration.

Conventionally, a higher mass is achieved by using cast iron pulleys instead of spun sheet metal. The problem with cast iron is that due to its manufacturing process, i.e. cast in sand, it has to be machined to achieve the desired final shape and dimension. Machining is a relatively expensive operation as it adds time and labor costs as well as creating waste. Furthermore, machined grooves of a multiple ribbed or other types of pulleys are rougher than a spun part due to the existence of machining marks (grooves) caused by the cutting head. This leads to decreased belt life.

Furthermore, machining exposes porosities, which are inherent in castings. The sharp edges of open porosities are detrimental to a belt running on the grooves. Machining the grooves also cuts through the grain structure creating an overall weaker structure.

Representative of the art is U.S. Pat. No. 3,874,049 (1975) to Ferguson which discloses a method of forming powdered metal parts wherein a sintered preform is cold formed and during such forming shear forces are applied to the surface of the preform where a bearing surface is desired by causing a moveable die to penetrate and wipe along such surface area of the preform.

Also representative of the art is U.S. Pat. No. 5,947,853 (1999) to Hodjat et al. which discloses a pulley with an integral hub spun-roll formed of a disc of sheet metal where the hub has a thickness greater than the thickness of the sheet metal.

What is needed is a method of flow forming sintered or cast metal parts. What is needed is a method of densifying sintered powder metal parts by spinning. What is needed is a method of manufacturing low cost, net-shaped, high inertia pulleys for crankshaft dampers by flow forming sintered or cast metal parts. The present invention meets these needs.

SUMMARY OF THE INVENTION

The primary aspect of the invention is to provide a method of flow forming sintered or cast metal parts.

Another aspect of the invention is to provide a method of densifying sintered powder metal parts by flow forming.

Another aspect of the invention is to provide a method of manufacturing low cost, net-shaped, high inertia pulleys for crankshaft dampers by flow forming sintered or cast metal parts.

Other aspects of the invention will be pointed out or made obvious by the following description of the invention and the accompanying drawings.

A method of flow forming sintered metal parts. The first step is forming a round disk by conventional powder metal process. The disk can be a donut shape part with or without a flange on one side of its outer diameter. The disk can then be copper impregnated or used as is, depending on the requirements. The disk is placed in a spinner held in proper tooling and grooves are spun in its outer diameter. The spinning can be done with a finishing roller or by a pre-finishing roller, followed by a finishing roller. This process not only creates a part with great accuracy, it also densifies and eliminates the powder metal porosities in the entire groove structure and on the surface layer by the pressures inserted in spinning.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 3 is a cross sectional schematic view of a typical spinning machine.

DETAILED DESCRIPTION OF THE PREFERRED EMBODIMENT

Figure 1:
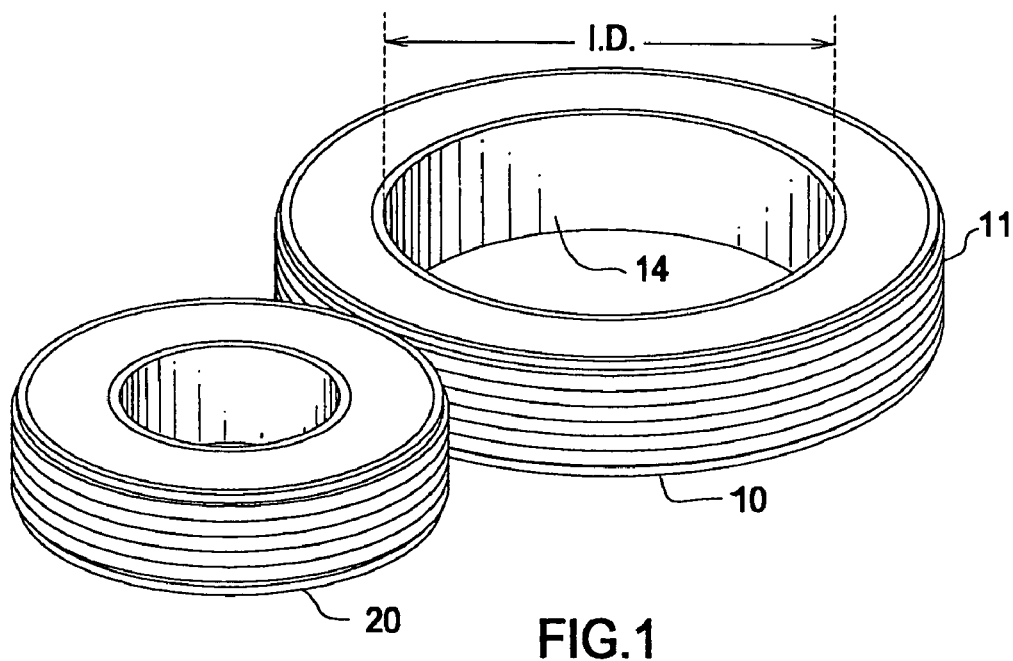
FIG. 1 is a perspective view of a blank and roller.

Powder metal (PM) is a known method of manufacturing ferrous and nonferrous parts. First, elemental or alloy powders are mixed and compacted in a die. The resultant shapes are then sintered or heated in a controlled-atmosphere furnace to metallurgically bond the particles. PM is generally a low waste metalworking process, typically using more than 97% of the starting raw material in the finished part. As a result PM is an energy and materials conserving process. Although PM is capable of producing parts to final dimensions, some finish machining is usually required to bring a part to a final high accuracy.

The first step of the inventive process is forming a round disk by conventional powder metal process. The disk can be a donut shaped part with or without a flange on one side of its outer diameter, see FIG. 1. Although flanges can be made on both sides of the outer diameter of the blank, it is a more difficult process in powder metal, requiring a cam action in the die. The disk can then be copper impregnated by known process, or used as is depending on the requirements.

Example PM material composition ranges (%) usable in the inventive process are as follows. Numerous formulations or mixtures for copper infiltrated iron and steel as well as iron-copper and copper steel are known in the art and can be successfully used in the inventive process. These formulations are offered by way of example and not of limitation.

| Material Designation | Fe % | Cu % | C % |
|---|---|---|---|
| FC-0205-40 | 93.5 | 1.5 | 0.3 |
| | 98.2 | 3.9 | 0.6 |
| FX-1008-50 | 82.2 | 8.0 | 0.6 |
| | 91.4 | 14.9 | 0.9 |

The foregoing material designations as well as several others equally as useful in this process can be found in the Metal Powder Industries Federation (MPIF) Standard 35, 1997 Edition. The inventive process can be applied to substantially any PM part so long as the sintered material is sufficiently malleable to be flow formed with the disclosed spinning process.

Powder metal is introduced into the tooling in a powder compaction press and compacted to a green strength in the shape of the desired ring. Press tonnage depends on the size (diameter and thickness) of the ring and also affects the part densification to a certain extent. The compacted ring is then introduced into a conveyor type, sintering furnace with inert atmosphere, to prevent oxidation, at a temperature of between approximately 1120 to 1150 degrees Celsius. The furnace generally comprises three zones, pre-heat, soak, and cool-down. After approximately 45 to 60 minutes, the sintered part exits the furnace.

In the sintering process powder particles melt on the surface, usually referred to as sweating, resulting in permanent attachment to each other to create a solid part. However, due to the geometry, shape, and size of particles, it is impossible to achieve 100% densification. Typical PM parts have a density in the range of approximately 85% to 92% of a solid metal part density. The remaining 15% to 8% comprises pores scattered throughout the PM part. Higher densifications are only achieved by mechanical work after the sintering. Mechanical work is normally accomplished by cold forging in a press. Mechanical work accomplished by hot forging, rolling, and other processes are also used in certain cases, or in the case of the instant invention, by flow forming.

For FC-0205-40 material, once sintered the part is ready to go to the spinning machine. For FX-1008-50 material, the part is first copper impregnated by going through another similar furnace, while a piece of copper is placed on top of it using a process known in the art. The copper piece melts and through capillary action is absorbed throughout the PM part.

The sintered part, either impregnated or non-impregnated, is moved to the spinner. Depending on the quality of the finish, a tumbling operation to improve the surface finish and remove any burrs might be performed before spinning. The foregoing pressures and temperatures are only offered by way of example and are not intended to limit the known range of pressures and temperatures that can be used to produce a PM part.

FIG. 1 is a perspective view of a blank and roller. For the next step of the inventive process, the sintered PM disk 10 is placed in a rotating mandrel of a spinning machine known in the art to form grooves 11 or other profiles known in the art including teeth, see FIG. 3. In the spinning machine, the part is placed in the tooling on the drive or headstock side H. The part is located in its inner diameter (ID) in the tooling. The headstock tooling holds the lower side of the part 10. The upper side of the equipment, the tailstock (T), moves down and clamps on the upper side of the part with a minimum of approximately 40 tons. The headstock (H) and tailstock (T) turn (R) at 400 to 900 rpm in most cases. Roughing roller 20 then laterally approaches the part (+D) and flow forms the part 10 to a semi-finished groove shape. The minimum roller slide force required is approximately 12 tons, however this may vary based on the desired depth of the flow formed portion. The force is dependent on the number of grooves of the pulley and the type of grooves and is varied accordingly. Once the rough form is spun into disk 10, the roughing roller then retracts (-D) and a finishing roller on the same path as the roughing roller moves to finish the flow forming of the pulley grooves 11. The finishing roller then retracts, tailstock (T) moves up, and the finished pulley is ejected.

The part density in the grooves and the portion under them (the areas affected by flow forming) is close to 100% of the solid material density from which the powder is made. If densification of the inner diameter is required, it is internally spun either flat or with any shape desired. Internal and external spinning is known and can be preformed simultaneously or in separate operations.

The pre-spinning PM ring is designed by calculating the actual volume of the finished part, including the densification. This means that the volume and diameter of the PM ring is somewhat larger than if a solid part were spun, thereby accounting for the volume change caused by removal of the porosities from the PM part.

Although impregnated PM part can also be used as described earlier, the impregnation is costly and densification of the non-impregnated material is preferred. Furthermore, the impregnation results in the part loosing its dimensional accuracy. Consequently, if copper impregnated parts are used, the spinning will be more for correcting the size, and shaping the pulley than densification.

The noted spinning steps are exemplary and are not intended to limit the number and type of steps that may be used in the inventive process or to finish the inventive part. The spinning process described herein comprises application of sufficient pressures without application of heat. Some warming of the part during spinning will occur by interaction of the roller with the part, but this is incidental to the process and of little or no effect, namely because a high volume of a coolant/lubricant is used in this operation to remove the heat generated by the flow forming. The heat removal is necessary to avoid damaging the forming roller by excessive heat. The lubricity of the coolant/lubricant is required to prevent excessive friction between the forming roller and the part.

Figure 2:
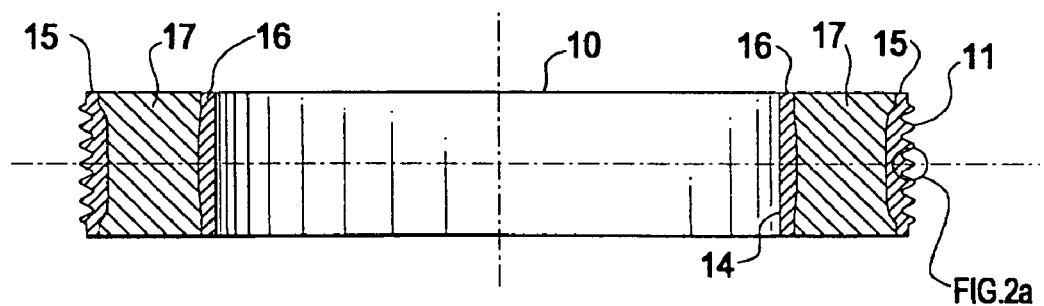
FIG. 2 is a cross-sectional view of a multiple ribbed pulley made using the inventive process.
Figure 2A:
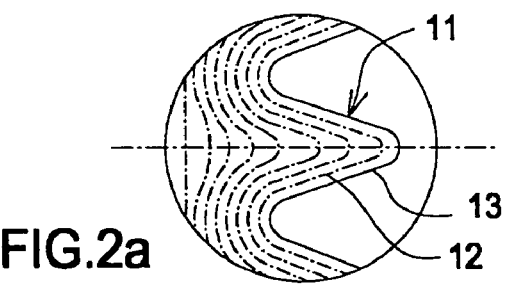
FIG. 2a is a detail of FIG. 2.

The disclosed process not only creates a multiple ribbed pulley with greater accuracy, it also densifies and eliminates porosities in the powder metal surface layer by the pressures realized by spinning, see FIG. 2a. The result is a highly accurate, net-shaped, and low cost multiple ribbed pulley or other part with the desired inertia for crankshaft damper pulleys.

The inertia of a pulley is calculated by multiplication of its mass times the square of the radius of the pulley. The limiting factor is the thickness of the pulley, specifically, the thickness of the metal measured from the bottom of each groove radially to the inner diameter of the part. The SAE and most other international standards call for a minimum thickness of 1.14 mm. Most pulleys are made with a thickness of 1.5 mm. Based on existing known processes, and with reasonable operating cost, for example not adding many more rolls to the gathering and spinning process, the limit for the thickness of material at the bottom of the grooves is a maximum of 4.0 mm. This results in different inertia values for different pulleys based on diameter and the number of grooves.

In contrast, PM and cast parts can be made with allowance for thickness at the bottom of groves in any amount without any substantial limitations. Allowance is meant by the fact that multiple-ribbed pulley grooves cannot be made in a PM process since side-way or lateral compaction of the powder is practically and financially impossible. So, a solid part has to be made and grooves have to be either cut in it per the prior art, or flow formed in it as described in the instant process.

Although prior art dampers can be made with the spun sheet metal pulleys, there are many that require much more inertia than is afforded by a sheet metal pulley. This requires the thickness at the bottom of the grooves to be in a range of 5 mm to 30 mm for most automotive dampers. This range of thicknesses is currently impossible to make with sheet metal processes.

This description is partially cast in terms of a crankshaft damper pulley. However, it is only an example and it not intended to limit the products to which the inventive process can be applied. A crankshaft damper damps the vibrations generated in an engine crankshaft by firing of the cylinders. A crankshaft damper generally comprises a hub and outer pulley with an elastomeric member disposed between them.

The torsional vibration amplitude is usually between one to two degrees. This vibration is excessive and can cause the failure of the crankshaft by fatigue and create noise. Crankshaft dampers damp this vibration by means of two things: a spring, usually in the form of a vibration absorbing elastomeric member; and, an inertia mass, usually combined with the pulley. The inertia mass counters the vibration and with the help of the elastomer reduces the amplitude of the vibration. An exemplary value of inertia for flow formed sheet metal dampers is usually in the range of approximately 4,000 to 10,000 kg.mm$^2$. On the other hand, the inertia for flow formed cast and PM pulleys using the inventive process are in the range of approximately 8,000 to 30,000 kg.mm$^2$. This represents an increase of approximately 100 to 300% over spun sheet metal pulleys. This increase is exemplary and is not intended to limit the increase in inertia that may be realized using the inventive process.

The inventive process utilizes the net-shape and low cost of powder metal process and combines it with the net-shape and accuracy of spinning, while simultaneously only densifying the desired portions of the powder metal part. The densification increases the part strength and reduces the possibility of internal corrosion.

The same process of spinning and flow forming a pre-formed powder metal part described herein can also be applied to spinning and flow forming a pre-formed casting with most of the similar advantages. The casting only need comprise a material malleable enough to allow the part metal to flow during the flow forming process. Casting materials can include but are not limited to steel, aluminum, stainless steels, titanium, magnesium, and alloys thereof.

Both for PM and cast parts the flow forming of the grooves results in smooth surfaces which facilitate a long belt life. On the contrary machined groves wear the belt much more quickly than spun formed grooves since they suffer from grooved surfaces.

FIG. 2 is a cross-sectional view of a multiple ribbed pulley made using the inventive process. FIG. 2a is a detail of FIG. 2. The improved grain structure in the rib area is shown in FIG. 2a. The flow forming process causes a grain structure portion 12 in an outer portion of the body 10 to be oriented substantially parallel to a rib surface 13. The density of the material in the outer portion 15, including the ribs, is substantially increased while substantially eliminating porosity. The density of the ribs and outer portion 15 approaches 100% of the metal density. Therefore, portion 15 comprises an 8–15% density increase over the density of the PM body portion 17 not subjected to flow forming.

The flow forming improves the strength of the part by forming the grains of the steel versus cutting them as occurs during machining. Furthermore, flow forming creates work hardening, which improves the mechanical properties of the material by 50% or more. The forces of forming, above the yield strength and below the ultimate tensile strength (the plastic zone), cause the organized metal crystal arrays to be broken, creating "dislocations". Atoms of metal are at a higher exited energy level in the dislocated areas. The atoms excitation is reflected in the material as improved mechanical properties, including greater strength for the part. As the sintered metal flow occurs in the plastic state, all the pores existing in the sintered metal created by the PM process or by casting are closed and disappear practically. Mechanical properties such as yield strength, ultimate tensile strength, and hardness are also an indication of material strength improved by the inventive process.

The internal diameter surface 14 of the disk, see FIG. 2, can be spun in an internal spinning operation (known in the art of sheet metal spinning) to densify the material in inner portion 16 giving portion 16 more dimensional accuracy as well. Any desired profile can be spun into surface 14, for example a curvilinear form for mechanically engaging and accepting a damper elastomeric member (not shown). An internal diameter surface 14 so flowed can receive a bearing, for example. As with portion 15, flow formed portion 16 comprises an 8–15% density increase over the density of the PM body portion 17 not subjected to flow forming.

The depth or thickness of portion 15 and portion 16 is a function of the forming pressures used during spinning and can be adjusted to suit the needs of a particular design. It should be understood that although certain references herein are to a 'surface' the effects of spinning the body extend to a depth within the body depending upon the pressures used during the spinning flow forming process, thereby creating a volume having a greater density in the spun portion as opposed to the portion not subjected to flow forming.

Flow forming narrows dimensional tolerances to more highly accurate levels while densifying all or selected portions of the part, all without need for finish machining. Both internal and external surface spinning can be performed simultaneously in one spinning machine, if required. Of course, finish machining of any desired surface may be performed if required as well.

The foregoing description is made for purpose of illustration only and is not intended to limit the scope of the invention which is to be determined by the appended claims.

Further, although a form of the invention has been described herein, it will be obvious to those skilled in the art that variations may be made in the construction and relation of parts without departing from the spirit and scope of the invention described herein.

I claim:

1. A method of manufacturing comprising the steps of:
preparing a powder metal mixture;
putting the powder metal mixture into a die;
compressing the powder metal mixture to form a part;
removing the part from the die;
sintering the part by application of heat;
spinning the part with a rotating mandrel;
engaging the part with a roller while spinning the part;
flow forming the part with the roller solely by a radial movement of the roller; and
forming a multiple ribbed surface in the part.

2. The method as in claim 1 further comprising the step of flow forming an inside diameter surface of the part.

3. The method as in claim 1, wherein the part comprises a multiple ribbed pulley.

4. The method as in claim 1 further comprising forming a grain structure oriented sibstantially parallel to a rib surface.

5. The method as in claim 1, wherein the multiple ribbed surface of the part has a density close tO 100% of the solid material density of the powder metal mixture.

6. The method as in claim 1, wherein the part further comprises an inertia in the range of approximately 8000 kg mn$^2$ to approximately 30,000 kg mm$^2$.

* * * * *